United States Patent
Park et al.

(10) Patent No.: US 11,416,099 B2
(45) Date of Patent: Aug. 16, 2022

(54) TOUCH DISPLAY PANEL AND TOUCH DISPLAY DEVICE COMPRISING THE SAME

(71) Applicant: LG Display Co., Ltd., Seoul (KR)

(72) Inventors: Yongchan Park, Seoul (KR); Inhyuk Song, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/115,642

(22) Filed: Dec. 8, 2020

(65) Prior Publication Data
US 2021/0200355 A1 Jul. 1, 2021

(30) Foreign Application Priority Data

Dec. 31, 2019 (KR) .......................... 10-2019-0179154

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0443* (2019.05); *G06F 3/0445* (2019.05); *G06F 2203/04107* (2013.01)

(58) Field of Classification Search
CPC .. G06F 3/0443; G06F 3/04164; G06F 3/0412; G06F 3/044–0448; G06F 2203/04107
See application file for complete search history.

(56) References Cited

U.S. PATENT DOCUMENTS

| | | | | |
|---|---|---|---|---|
| 2013/0342770 A1* | 12/2013 | Kim | ..................... | G06F 3/0443 349/12 |
| 2014/0327649 A1* | 11/2014 | Lee | ..................... | A63B 71/0054 345/174 |
| 2016/0188063 A1* | 6/2016 | Kim | ..................... | G09G 3/3648 345/173 |
| 2017/0192565 A1* | 7/2017 | Pan | ..................... | G02B 6/0083 |
| 2017/0262097 A1* | 9/2017 | Rowe | ..................... | G06F 3/0446 |
| 2018/0088727 A1* | 3/2018 | Gwon | ..................... | G06F 3/0418 |
| 2019/0079623 A1* | 3/2019 | Kim | ..................... | G06F 3/04164 |

FOREIGN PATENT DOCUMENTS

| | | |
|---|---|---|
| KR | 10-1651408 B1 | 8/2016 |
| KR | 10-2019-0114458 A | 10/2019 |
| KR | 10-2020-0083195 A | 7/2020 |

\* cited by examiner

*Primary Examiner* — Sanjiv D. Patel
(74) *Attorney, Agent, or Firm* — Seed IP Law Group LLP

(57) ABSTRACT

The present disclosure relates to a touch display panel capable of significantly reducing a number of touch channels provided in a touch display panel in related art and a touch display device including the touch display panel. To this end, the touch display panel according to the present disclosure includes a plurality of touch blocks with a plurality of touch electrodes arranged in a row direction and a plurality of touch lines arranged in a column direction and connected to the touch electrodes, and the touch block includes a total of 25 touch electrodes and nine touch lines. Accordingly, according to the present disclosure, the touch display panel may significantly reduce a number of touch channels and the touch electrodes may be flush with the touch lines.

17 Claims, 15 Drawing Sheets

TOUCH DISPLAY PANEL AND TOUCH DISPLAY DEVICE COMPRISING THE SAME

CROSS-REFERENCE TO RELATED APPLICATION

This application claims priority to and the benefit of Korean Patent Application No. 10-2019-0179154, filed on Dec. 31, 2019, the disclosure of which is incorporated herein by reference in its entirety.

BACKGROUND

Technical Field

The present disclosure relates to a touch display panel capable of significantly reducing a number of touch channels of a touch display panel in related art and a touch display device including the touch display panel.

Description of the Related Art

Touch display devices may perform a touch-based input function for inputting, by users, information or commands easily, intuitively, and conveniently, as well as a function for displaying videos or images.

The touch display devices may determine user's touch and accurately sense touch coordinates to perform the touch-based input function. To this end, the touch display device may include a touch display panel having a touch sensor structure.

The touch display panel has the touch sensor structure including a plurality of touch electrodes and a plurality of touch lines for connecting the plurality of touch electrodes to a touch driving circuit. In some examples, a plurality of touch channels to which the touch driving circuit is electrically connected may be present in the touch display panel.

As the touch display panel incorporates the touch sensor structure that is complicated or that requires multiple layers, the manufacturing process of the touch display panel becomes complicated, the production yield of the touch display panel becomes lowered, and the manufacturing cost becomes high.

In addition, a number of touch electrodes is increased and a number of touch lines and a number of touch channels are each increased due to an increased size of the touch display panel, thereby resulting in an increase in complexity and manufacturing cost of the panels and an increase in the complexity and the manufacturing cost of circuit components.

BRIEF SUMMARY

The inventors of the present disclosure have fully acknowledged the above-mentioned problems and provided a solution to the problems.

The present disclosure provides a touch display panel to arrange touch electrodes and touch lines in a new manner to reduce a number of touch lines and to reduce a number of touch channels connected to touch driving circuits.

The present disclosure also provides a touch display panel to connect touch electrodes with touch lines in a new manner such that the touch electrodes are flush with the touch liens.

The present disclosure further provides a touch display device capable of preventing a capacitance formed by a data line from acting as noise to a touch sensing signal by disposing a shielding pattern between the touch electrode, the touch lines, and a data line.

The technical benefits of the present disclosure are not limited to the above-mentioned benefits, and other benefits and advantages of the present disclosure, which are not mentioned, may be understood by the following description, and more clearly understood by the embodiments of the present disclosure. It is also readily understood that the benefits and the advantages of the present disclosure may be implemented by features described in appended claims and a combination thereof.

In one or more embodiments, the present disclosure provides a touch display panel including a plurality of touch blocks with a plurality of touch electrodes disposed in a row direction and a plurality of touch lines disposed in a column direction and connected to the touch electrodes.

In some examples, to reduce the number of touch channels connected to the touch driving circuit by reducing the number of touch lines in the touch display panel according to the present disclosure, at least one touch block may include touch electrodes disposed in each of a first row to an n-th row (where n is a natural number of 2 or more), one touch electrode is disposed in each of odd-numbered rows among the touch electrodes in the first row to the n-th row, two or more touch electrodes are disposed in each of odd-numbered rows among the touch electrodes in the first row to the n-th row, touch electrodes disposed in the odd-numbered rows are connected to different touch lines, and each of the two or more touch electrodes disposed in each of the even-numbered rows may be connected to a same touch line as the touch electrodes disposed in a same column.

In this case, the plurality of touch lines disposed in each of the plurality of touch blocks do not overlap with one another.

In addition, each of the two or more touch electrodes disposed in each of the even-numbered rows may have a same size as one touch electrode disposed in each of the odd-numbered rows.

In some examples, four touch electrodes may be disposed in each of the even-numbered rows in the touch block and each of the two or more touch electrodes disposed in each of the even-numbered rows in the touch block may be connected to a same touch line as five touch electrodes disposed in a same column.

20 touch units including 25 touch electrodes may be disposed in the touch block and a number of touch channels connected to the touch driving circuit may be reduced to 36 from the touch unit having the same number as the touch unit in related art. Therefore, the number of touch lines and the number of touch channels disposed in the touch display panel may each be reduced.

In addition, in order for the touch electrodes to be flush with the touch lines, the touch electrodes disposed in the odd-numbered rows in the touch block are alternately connected to the touch lines at a first side and a second side of the touch electrode. Each of the touch electrodes disposed in each of the even-numbered rows in the touch block may be connected to the touch line to surround each of the touch electrodes disposed in each of the even-numbered rows at the first side thereof or the second side thereof.

In addition, in order for the touch electrodes to be flush with the touch lines, each of the touch electrodes disposed in each of the even-numbered rows in the touch block is connected to the touch line to surround each of the touch electrodes disposed in the odd-numbered rows at a first side thereof, and each of the touch electrodes disposed in the odd-numbered rows in the touch block may be connected to the touch line at a second side opposite to the first side at which each of the touch electrodes disposed in each of the even-numbered rows is connected to the touch line.

The present disclosure also provides a touch display device including a plurality of touch blocks with a plurality of touch electrodes disposed in a row direction and a plurality of touch lines disposed in a column direction and connected to the touch electrodes; and a data line disposed above or below each of the touch electrode and the touch line.

To reduce the number of touch channels connected to the touch driving circuit by reducing the number of touch lines, the touch block includes touch electrodes disposed in a first row to an n-th row (where n is a natural number of two or more), one touch electrode is disposed in each of odd-numbered rows among the touch electrodes in the first row to the n-th row, two or more touch electrodes are disposed in each of even-numbered rows among the touch electrodes in the first row to the n-th row, electrodes disposed in the odd-numbered rows are connected to different touch lines, and each of the two or more touch electrodes disposed in each of the even-numbered rows may be connected to a same touch line as the touch electrodes disposed in a same column.

In this case, the plurality of touch lines disposed in each of the plurality of touch blocks do not overlap with one another.

In addition, a shielding pattern may be disposed between the touch electrode, the touch lines, and the data line in the touch block to prevent capacitance formed by the data line from acting as noise to a touch sensing signal.

The shielding pattern may overlap with each of the touch electrode and the touch lines.

According to the present disclosure, the number of touch lines may be greatly reduced by arranging the touch electrodes and the touch lines in a novel manner, and accordingly, the number of touch channels connected to the touch driving circuit may be greatly reduced.

In addition, as the number of touch channels may be reduced, the size of the touch driving circuit is not increased, and although the number of touch lines and the number of touch channels are each reduced, the touch display panel according to the present disclosure may have a same level of touch sensing performance as a touch display panel in related art.

In addition, the number of touch lines and the number of touch channels are each reduced, thereby resulting in a reduction in complexity of the touch display panel and the manufacturing cost of the touch display panel.

In addition, the touch electrodes may be flush with the touch lines to implement the thinning of the large-sized touch display device.

Furthermore, according to the present disclosure, the touch display device may have a shielding pattern between the touch electrode, the touch lines, and the data line to prevent direct capacitance from being formed between the touch electrode, the touch lines, and the data line. Therefore, the capacitance formed by the data line may be prevented from acting as noise to the touch sensing signal.

DETAILED DESCRIPTION

Figure 1:
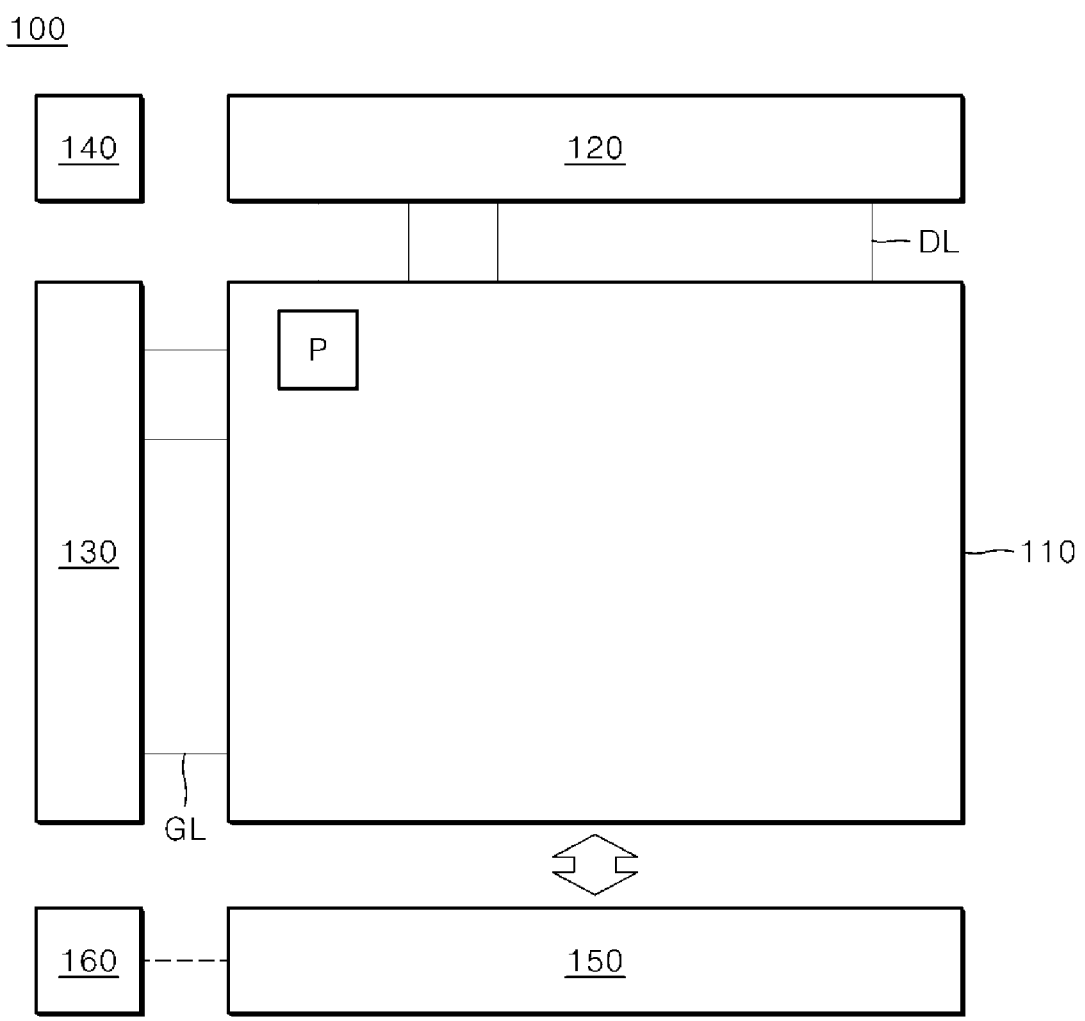
FIG. 1 is a schematic system configuration diagram showing a touch display device having a touch structure.

Some embodiments of the present disclosure are described in detail with reference to the accompanying drawings. Accordingly, the skilled person in the art to which the present disclosure pertains may easily implement the technical idea of the present disclosure. In the description of the present disclosure, if it is determined that a detailed description of a well-known technology relating to the present disclosure may be omitted if it unnecessarily obscures the gist of the present disclosure. One or more embodiments of the present disclosure are described in detail with reference to the accompanying drawings. In the drawings, same reference numerals can be used to refer to same or similar components.

In this document, the terms "upper," "lower," "on," "under," or the like are used such that, where a first component is arranged at "an upper portion" or "a lower portion" of a second component, the first component may be arranged in contact with the upper surface (or the lower surface) of the second component, or another component may be disposed between the first component and the second component. Similarly, where a first component is arranged on or under a second component, the first component may be arranged directly on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Hereinafter, a touch display panel and a touch display panel including the touch display panel according to the present disclosure are described.

FIG. 1 is a schematic system configuration diagram showing a touch display device 100 having a touch structure.

Referring to FIG. 1, the touch display device 100 having the touch structure includes a touch display panel 110, a data driver 120, a gate driver 130, a timing controller 140, and at least one touch driving circuit 150, and a power driving circuit 160.

A plurality of data lines DL and a plurality of gate lines GL overlapping with each other are disposed in the touch display panel 110 and a pixel P is adjacently disposed at a location where one data line overlaps with the at least one gate line.

Each pixel P of the touch display panel 110 includes an organic light emitting diode (OLED), at least two transistors, and at least one capacitor according to a pixel design method.

However, the touch display panel 110 is not limited to the above-described OLED and may implement colors through various types of devices such as a liquid crystal display (LCD) and the OLED.

The data driver 120 drives the plurality of data lines DL. The gate driver 130 sequentially drives the plurality of gate lines GL.

The timing controller 140 outputs image data to the data driver 120 and outputs control signals such as a data control signal (DCS) and a gate control signal (GCS) to control each of the data driver 120 and the gate driver 130.

In some examples, the touch display device 100 and the touch display panel 110 having the touch structure according to the present disclosure may each operate in a display mode and a touch mode.

For example, one frame period is divided into a display mode period and a touch mode period, and in the display mode period, the touch display device 100 and the touch display panel 110 each operate in the display mode, and in the touch mode period, the touch display device 100 and the touch display panel 110 each operate in the touch mode.

In the touch mode period, the touch display device 100 and the touch display panel 110 each operate in the touch mode and a plurality of touch electrodes are disposed for touch driving and touch sensing.

Figure 2:
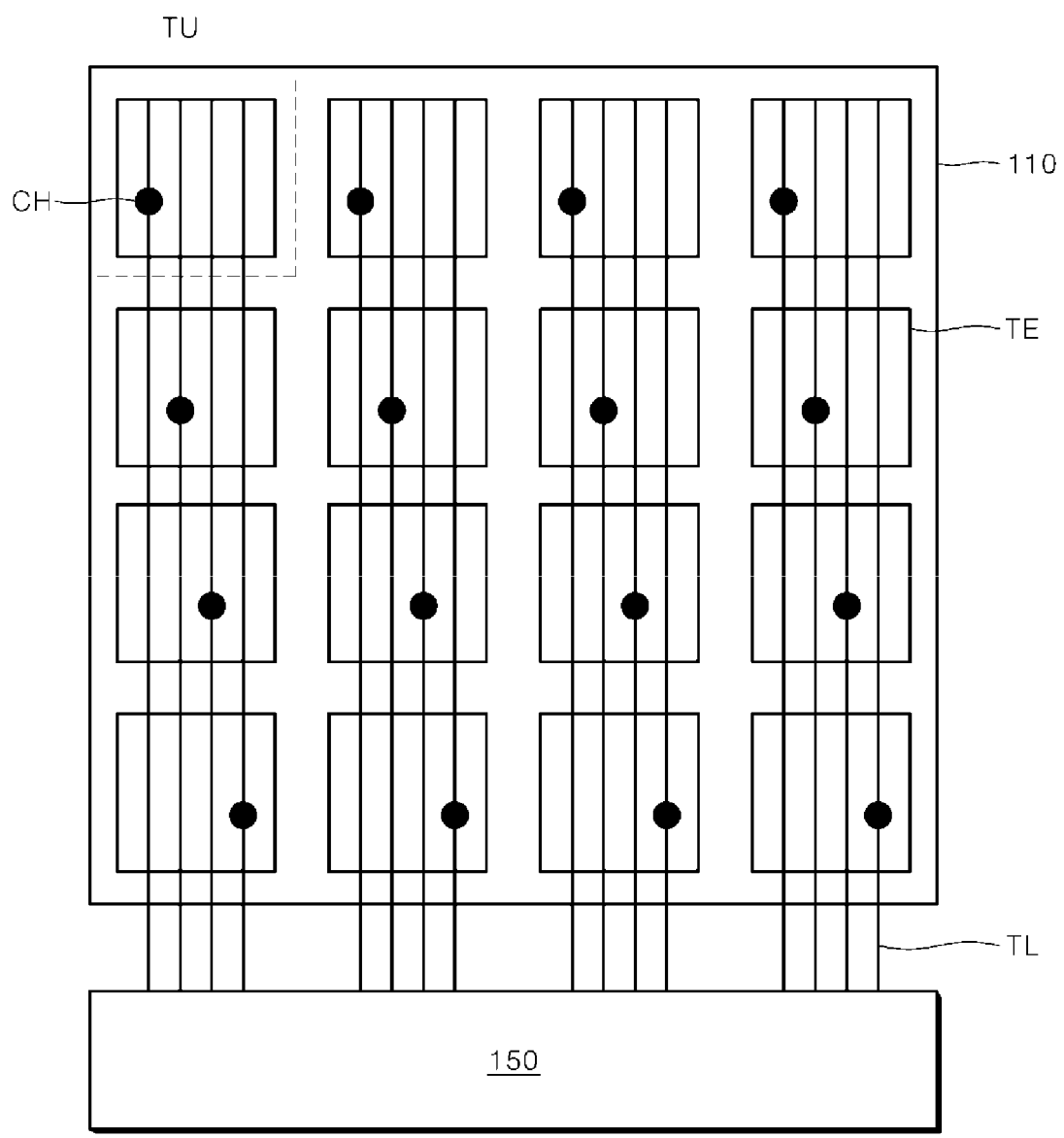
FIG. 2 is a schematic diagram showing touch electrodes and touch lines provided in the touch display panel in FIG. 1 in detail.

FIG. 2 is a schematic diagram showing touch electrodes and touch lines provided in the touch display panel 110 in FIG. 1 in detail.

Referring to FIG. 2, a plurality of touch electrodes TE and a plurality of touch lines TL are disposed in the touch display panel 110 and may be operatively connected to a touch driving circuit 150 to drive the touch electrodes TE and the touch lines TL.

The plurality of touch electrodes TE may be disposed on the touch display panel 110 or may be embedded in the touch display panel 110.

The plurality of touch electrodes TE may be separate from one another and each of the plurality of touch electrodes TE may be connected to the plurality of touch lines TL. In this case, the touch electrode TE may receive a touch driving signal output from the touch driving circuit 150 through the touch line TL and may transmit a touch sensing signal through the touch line TL.

Alternatively, the plurality of touch electrodes TE may include a TX electrode to which a touch driving signal is applied and an RX electrode to transmit a touch sensing signal.

In addition, in some cases where the touch display device is an LCD device, the plurality of touch electrodes TE may be a common electrode COM to which a common voltage for driving a display is applied during driving of the display.

For example, the plurality of touch electrodes TE may receive the common voltage when driving a display and may receive the touch driving signal at a time of touch driving.

The plurality of touch lines TL may be overlapped with each of the touch electrodes TE and each touch line TL may be connected to one touch electrode TE through a contact hole CH.

In some embodiments, the plurality of touch lines TL are disposed along an outer area of the touch display panel 110 and may be connected to each of the touch electrodes TE.

In addition, in some cases where a plurality of touch electrodes TE include the TX electrode and the RX electrode, the touch line TL may be divided into a touch line TL connected to the TX electrode and a touch line TL connected to the RX electrode.

The touch driving circuit 150 may output a touch driving signal to the touch electrode TE through the touch line TL at a time of touch driving and may receive the touch sensing signal to sense user's touch to the touch display panel 110 and a position touched by users.

The touch driving circuit 150 may sense a touch based on changes in capacitance generated when the user touches the touch display panel 110. For example, the touch driving circuit 150 may sense the touch through a self-capacitance sensing method or a mutual capacitance sensing method. Other sensing methods may be utilized as understood by a person of ordinary skill in the art.

In the case of the self-capacitance sensing method, the touch driving circuit 150 outputs a touch driving signal to each touch electrode TE through the touch line TL during the touch driving period and receives the touch sensing signal to sense the user's touch.

In the case of the mutual capacitance sensing method, the touch driving circuit 150 outputs a touch driving signal through the touch line TL connected to the TX electrode, receives the touch sensing signal through the touch line TL connected to the RX electrode to sense the user's touch during the touch driving period.

In addition, the self-capacitance sensing method is used during a first time period among a certain time period and the mutual capacitance sensing method is used during a second time period among the certain time period. That is, the user's touch may be sensed using the two types of sensing methods.

In some examples, as shown in FIG. 2, if one touch electrode TE is electrically connected to one touch line TL, a number of the plurality of touch lines TL may be identical to a number of a plurality of touch electrodes TE. The number of the plurality of touch lines TL corresponds to a number of touch channels for signal input and output of the touch driving circuit 150.

According to FIG. 2, 16 touch electrodes TE are arranged in four rows and four columns in the touch display panel 110. In this case, 16 touch lines TL and 16 touch channels may be present. For example, the number of touch electrodes TE is determined based on a product of the number of touch electrodes TE disposed in one row and the number of touch electrodes TE disposed in one column.

In addition, the number of touch channels and the number of touch lines TL each are determined based on a product of the number of touch electrodes TE disposed in one row and the number of touch electrodes TE disposed in one column.

Therefore, as the number of touch electrodes TE increases, the number of touch lines TL and the number of touch channels each increase, and when a size of the touch display panel 110 is increased or a large number of touch electrodes are provided to improve touch sensing precision, the number of touch lines and the number of touch channels each increase significantly, thereby resulting in the complicated touch display panel 110, making it difficult to manufacture, and the complicated touch driving circuit.

Figure 3:
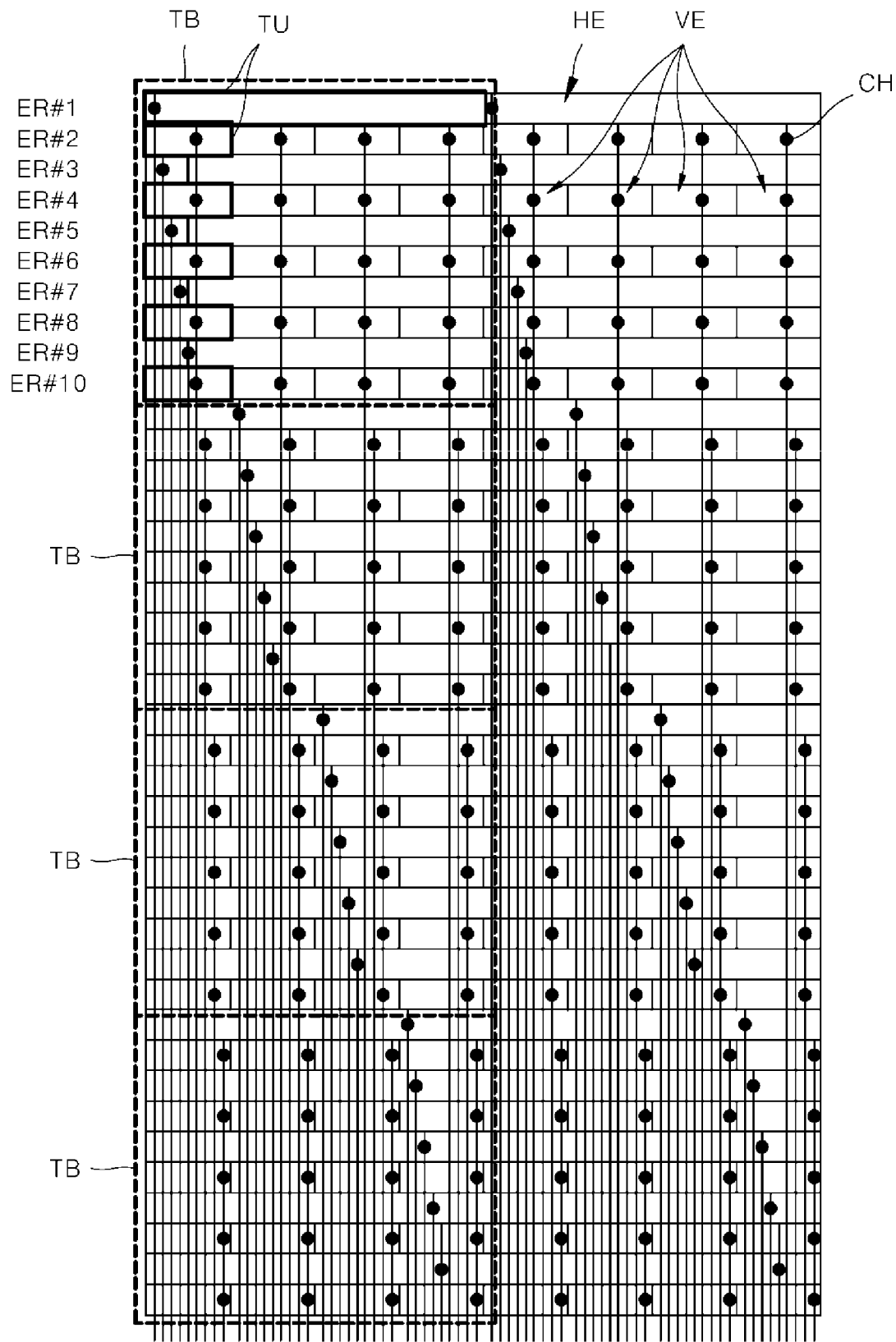
FIG. 3 is a plan view showing an example of a touch display panel according to one embodiment of the present disclosure.

FIG. 3 is a plan view showing an example of a touch display panel according to one embodiment of the present disclosure.

In the touch display panel according to the present disclosure, a plurality of touch blocks TB may be combined to form one touch display panel, where one touch block TB is a repetition unit. As shown in FIG. 3, the touch blocks are indicated by dotted lines.

According to the present disclosure, the touch display panel may include a plurality of touch blocks with a plurality of touch electrodes disposed in a row direction and a plurality of touch lines arranged in a column direction and connected to the touch electrodes.

In some examples, the touch block includes touch electrodes disposed in a first row to an n-th row, where n is a natural number that is equal to or greater than 2, one touch electrode is disposed in each of odd-numbered rows among the touch electrodes in the first row to the n-th row, two or more touch electrodes are disposed in each of even-numbered rows among the touch electrodes in the first row to the n-th row, touch electrodes disposed in the odd-numbered rows are connected to different touch lines, each of two or more touch electrodes disposed in each of the even-numbered rows is connected to a same touch line as the touch electrodes disposed in a same column, and a plurality of touch lines disposed in each of the plurality of touch blocks do not overlap with one another.

FIG. 3 shows an example of the touch block. In FIG. 3, a total of eight touch blocks are combined to form one touch display panel, but eight or more touch blocks are combined to form one touch display panel.

Referring to FIG. 3, 20 touch units TU are present in one touch block TB indicated by dotted lines in the touch display panel according to the present disclosure.

The touch unit TU does not refer to a specific component, but may be determined as a minimum range of input of user's touch.

In some examples, in the touch display panel according to the present disclosure, the touch block TB includes the touch electrodes TE in the first row to the 10th row (ER #1 to ER #10) arranged in a column direction.

In one touch block TB, one electrode HE may be disposed in each of the odd-numbered rows (ER #1, ER #3, ER #5, ER #7, and ER #9) among the touch electrodes TE in the first row to the 10th row (ER #1 to ER #10).

In one touch block TB, four electrodes VE are disposed in each of the touch electrodes TE in the even-numbered rows (ER #2, ER #4, ER #6, ER #8, and ER #10) among the touch electrodes TE in the first row to the 10th row (ER #1 to ER #10).

In one touch block TB, the touch electrodes TE in the odd-numbered rows (ER #1, ER #3, ER #5, ER #7, and ER #9; HE) among the touch electrodes TE in the first row to the 10th row (ER #1 to ER #10) may be connected to different touch lines TL.

The touch electrodes TE in each of the even-numbered columns (ER #2, ER #4, ER #6, ER #8, and ER #10; VE) among the touch electrodes TE in the first row to the 10th row (ER #1 to ER #10) may be electrically connected to a same touch line TL as five electrodes VE disposed in the same column.

Therefore, in the case of touch electrodes in the even-numbered rows (ER #2, ER #4, ER #6, ER #8, and ER #10; VE), the electrodes VE disposed in the same column are connected to one another through one touch line TL and operate as one touch unit TU. Each of the touch electrodes TE disposed in the odd-numbered rows (ER #1, ER #3, ER #5, ER #7, and ER #9) operates as one touch unit TU.

In one touch block TB, the touch electrode TE in each of the odd-numbered rows (ER #1, ER #3, ER #5, ER #7, and ER #9) may have the same size as each of the touch electrodes TE in each of even-numbered rows (ER #2, ER #4, ER #6, ER #8, and ER #10; VE).

For example, each of the touch electrodes TE in each of the even-numbered rows (ER #2, ER #4, ER #6, ER #8, and ER #10; VE) in which four electrodes are disposed may have the same size as the touch electrode TE in each of the odd-numbered rows (ER #1, ER #3, ER #5, ER #7, and ER #9) in which one electrode is disposed.

In one touch block TB, touch lines TL connected to the touch electrodes TE in the odd-numbered rows (ER #1, ER #3, ER #5, ER #7, and ER #9; HE) among the touch electrodes TE in the first row to the 10th row (ER #1 to ER #10) may be disposed in the column direction.

In one touch block TB, the touch line TL connected to the touch electrodes TE in the even-numbered rows (ER #2, ER #4, ER #6, ER #8, and ER #10; VE) among the touch electrodes in the first row to the 10th row (ER #1 to ER #10) may connect five electrodes VE disposed in the same column with one another and may be disposed in the column direction.

In one touch block TB, contact holes CH connecting touch electrodes TE and the touch lines TL in the odd-numbered rows (ER #1, ER #3, ER #5, ER #7, and ER #9) among the touch electrodes TE in the first row to the 10th row (ER #1 to ER #10) do not overlap with one another.

Further, in one touch block TB, the contact holes CH connecting the touch electrodes TE and the touch lines TL in the even-numbered rows (ER #2, ER #4, ER #6, ER #8, and ER #10; VE) among the touch electrodes TE in the first row to the 10th row (ER #1 to ER #10) are arranged such that five electrodes VE disposed in the same column do not overlap with the electrodes in the even-numbered rows in another touch block TB.

Figure 4A:
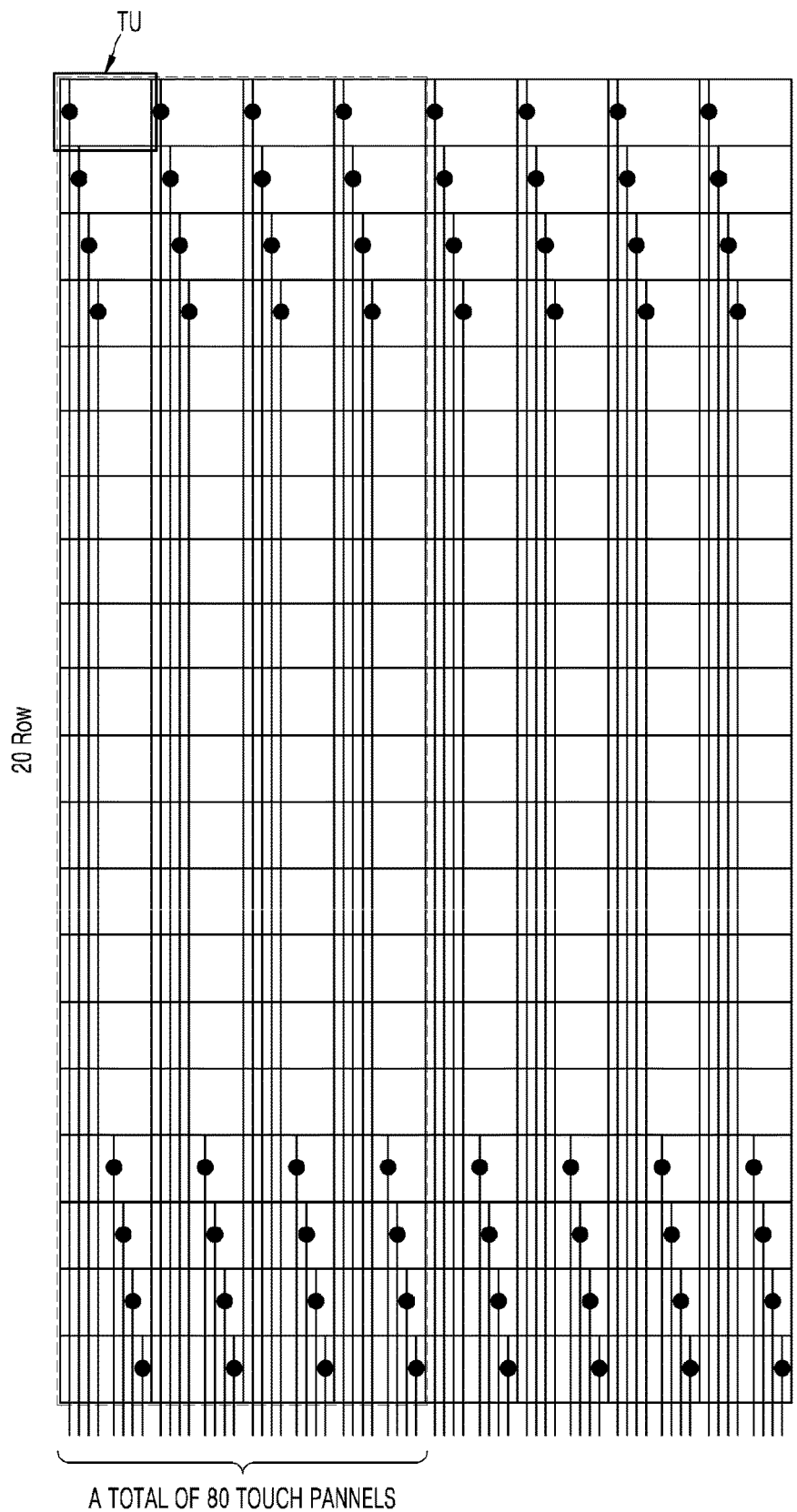
FIGS. 4A and 4B are plan views showing an example touch display panel and a display panel in related art.
Figure 4B:
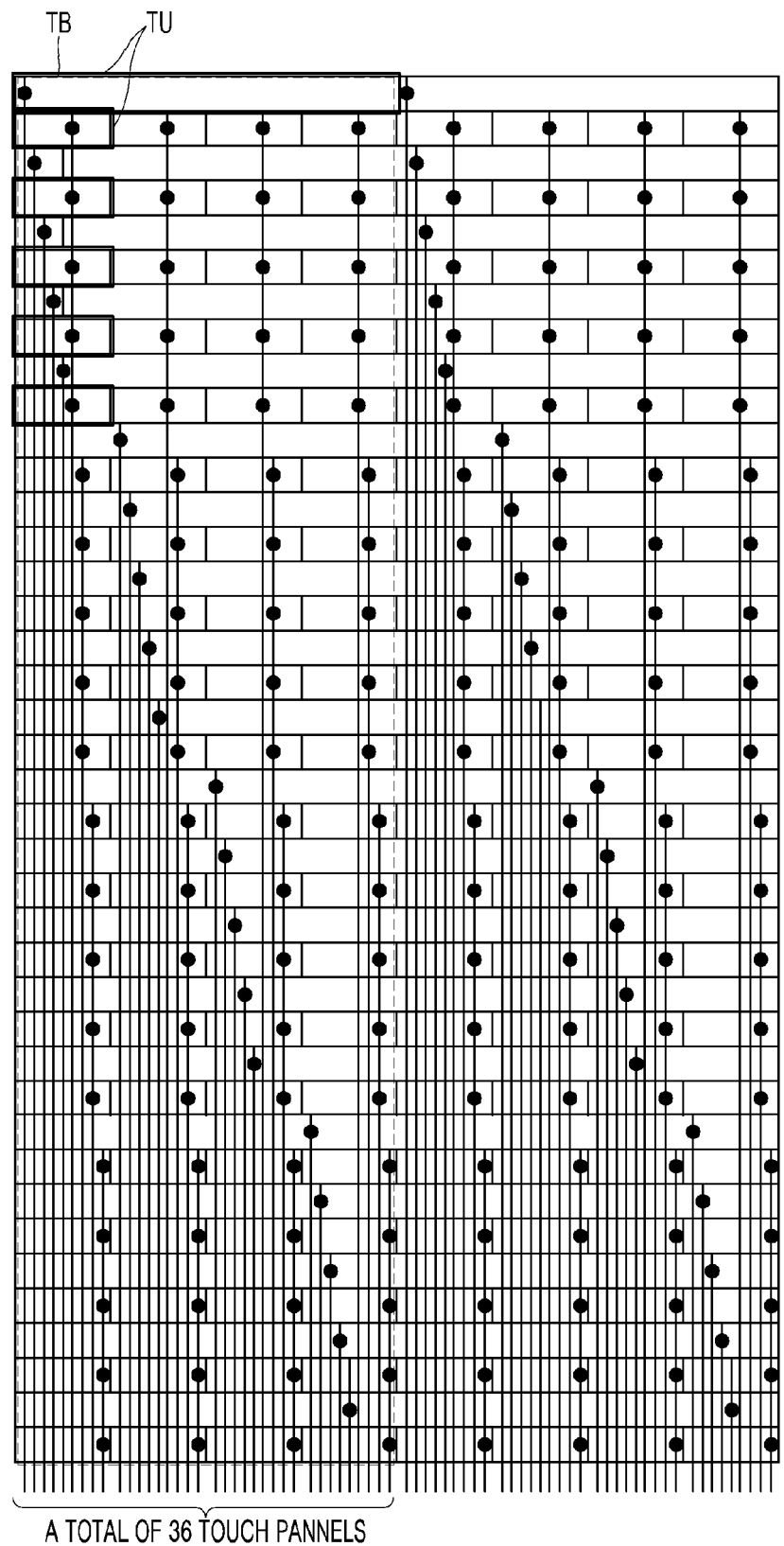

FIGS. 4A and 4B are plan views showing an example touch display panel and a touch display panel in related art.

As shown in FIGS. 4A and 4B, in related art, the touch display panel includes 80 touch electrodes TE arranged in 20 rows and four columns and a minimum of 80 touch lines TL may be disposed in the touch display panel to connect 80 touch electrodes TE to a touch driving circuit (this configuration is indicated by dotted lines in FIG. 4A). Therefore, the total of 80 channels are needed.

In the case of the touch display panel in the related art, as each of the touch electrodes may be connected to the touch line, the number of touch lines and the number of touch channels are each increased, and the size of the touch driving circuit is increased.

Accordingly, contrary to the related art, the present disclosure provides a touch display panel having a novel electrode arrangement structure and an electrode connection structure capable of reducing the number of touch lines and the number of touch channels.

When 20 touch units TU present in one touch block TB in the touch display panel according to the present disclosure are compared with 20 touch units in the touch display panel in related art, a total of 25 touch electrodes TE are disposed in the touch display panel according to the present disclosure and the 20 touch electrodes are disposed in the touch display panel in related art.

With respect to the same number of touch units TU in the touch display panel according to the present disclosure and the touch display panel in the related art, nine touch lines TL are disposed in the touch display panel according to the present disclosure and the 20 touch lines TL are disposed in the touch display panel in related art. Accordingly, the number of touch lines TL of the touch display panel according to the present disclosure is greatly reduced.

For example, as indicated in dotted area in FIGS. 4A and 4B, in the touch display panel according to the present disclosure in the touch panel having the same size as the touch panel in related art, nine touch lines TL are disposed in one touch block and a total of 36 touch lines TL are disposed, and 80 touch lines TL are disposed in the touch display panel in related art.

Therefore, as shown in FIGS. 4A and 4B, a total of 80 touch channels are needed in the touch display panel in related art, but only 36 touch channels may be disposed in the touch display panel according to the present disclosure, Accordingly, the number of touch lines TL and the number of touch channels may each be greatly reduced and the size of the touch driving circuit is not increased.

This indicates that the touch display panel according to the present disclosure may reduce the number of touch lines TL and the number of touch channels compared to the touch display panel in related art but may have the substantially the same level of touch sensing performance as the touch display panel in related art.

Figure 5:
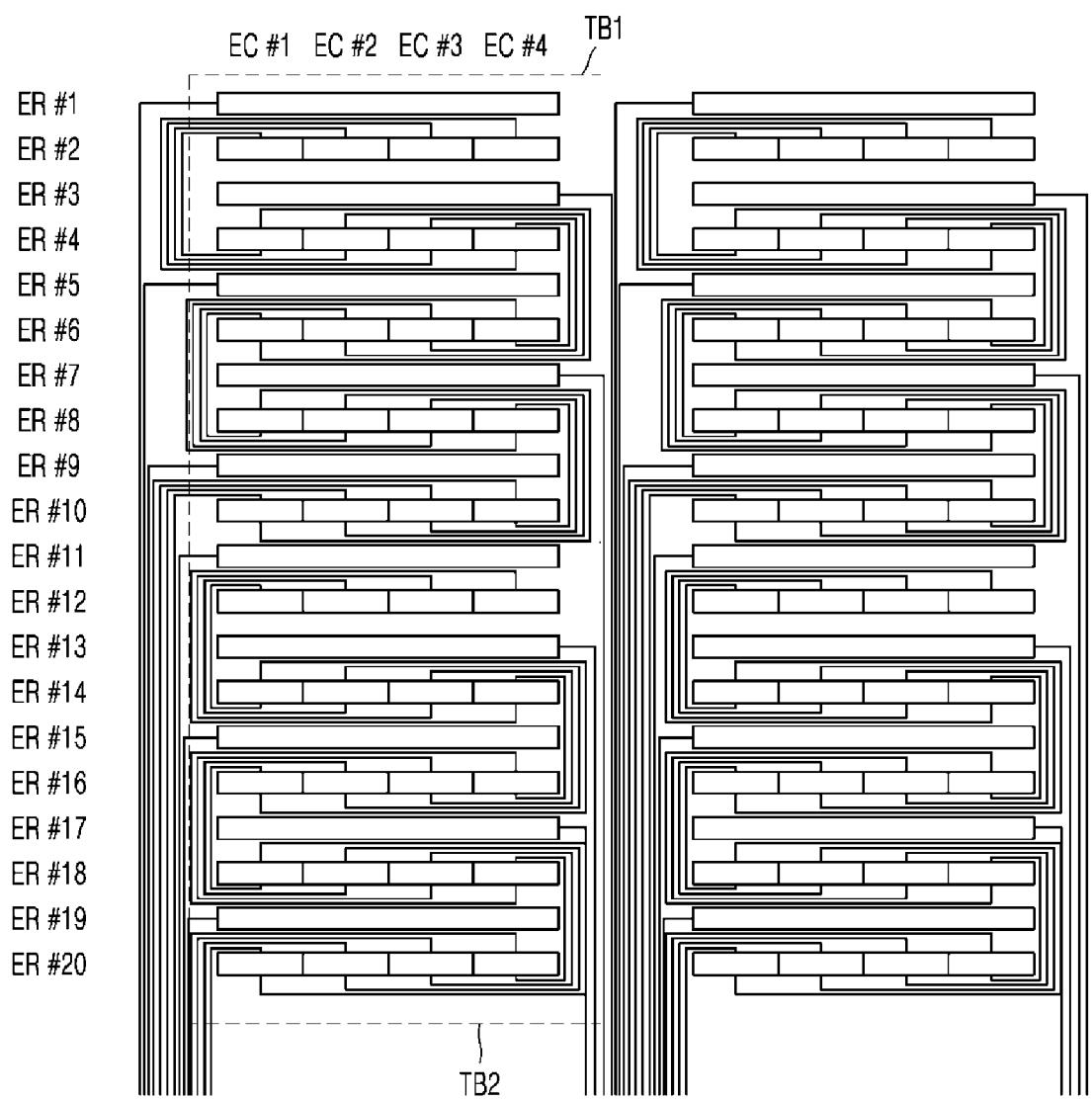
FIG. 5 is a plan view showing example connection between at least one touch electrode and at least one touch line in a touch display panel according to one or more embodiments of the present disclosure.

FIG. 5 is a plan view showing example connection between at least one touch electrode and at least one touch line in a touch display panel according to one or more embodiments of the present disclosure.

Referring to FIGS. 4A and 4B, the touch lines TL disposed on the touch display panel are overlapped with and connected to each of the touch electrodes TE. As shown in FIG. 5, in the touch display panel according to the present disclosure, the touch lines TL connecting the touch electrodes TE do not intersect and overlap with other touch electrodes TE.

In some examples, in the touch display panel shown in FIG. 5, the touch block TB is a unit connection group connecting the touch electrode TE to the touch line TL.

In the touch electrodes TE in the odd-numbered rows (ER #1, ER #3, ER #5, ER #7, and ER #9) in the touch block TB, the touch line TL connected to the touch electrode TE in the first row is connected to a first side of the touch electrode TE in the first row (ER #1), the touch line TL connected to the touch electrode TE in the third row (ER #3) is connected to a second side of the touch electrode in the third row (ER #3), a touch line TL connected to the touch electrode TE in the fifth row (ER #5) is connected to a first side of the touch electrode TE in the fifth row (ER #5), a touch line TL connected to the touch electrode in the seventh row (ER #7) is connected to a second side of the touch electrode TE in the seventh row (ER #7), a touch line TL connected to the touch electrode TE in the ninth row (ER #9) is connected to a first side of the touch electrode TE in the ninth row (ER #9) in order for the touch lines to be finally connected to a touch driving circuit.

For example, in FIG. 5, touch electrodes TE disposed in the odd-numbered rows (ER #1, ER #3, ER #5, ER #7, and ER #9) in the touch block TB are connected to the touch driving circuit in a zigzag shape, which is alternately connected to the touch line TL at a first side and a second side of the touch electrode TE.

Each of four touch electrodes TE disposed in one of even-numbered rows (ER #2, ER #4, ER #6, ER #8, and ER #10) in the touch block TB is connected to one of five touch electrodes TE disposed in the same column among rows (EC #1 to EC #4) through the touch line TL to surround touch electrodes TE.

In some examples, in the touch electrodes TE disposed in each of the even-numbered rows (ER #2, ER #4, ER #6, ER #8, and ER #10) in the touch block TB, a touch line TL is connected to each of the touch electrode TE in the second row (ER #2) and the touch electrode TE in the fourth row (ER #4) to surround the touch electrode TE in the second row (ER #2) and the touch electrode TE in the fourth row (ER #4) at first sides thereof, a touch line TL is connected to each of a touch electrode TE in the fourth row (ER #4) and a touch electrode TE in the sixth row (ER #6) to surround the touch electrode TE in the fourth row (ER #4) and the touch electrode TE in the sixth row (ER #6) at second sides thereof, a touch line TL is connected to each of a touch electrode TE in the sixth row (ER #6) and a touch electrode TE in the eighth row (ER #8) to surround the touch electrode TE in the sixth row (ER #6) and the touch electrode TE in the eighth row (ER #8) at first sides thereof, a touch line TL is connected to each of a touch electrode TE in the eighth row (ER #8) and a touch electrode TE in the tenth row (ER #10) to surround the touch electrode TE in the eighth row (ER #8) and the touch electrode TE in the tenth row (ER #10) at second sides thereof in order for the touch lines to be finally connected to the touch driving circuit.

In a second touch block TB, touch electrodes TE in the odd-numbered rows (ER #11, ER #13, ER #15, ER #17, and ER #19) and the touch electrodes TE in even-numbered rows (ER #12, ER #14, ER #16, ER #18, and ER #20) are each connected to the touch lines TL in the same manner as described above and connected to the touch driving circuit.

Therefore, the touch lines TL connected to the touch electrodes TE in the odd-numbered rows (ER #1, ER #3, ER #5, ER #7, ER #9, ER #11, ER #13, ER #15, ER #17, and ER #19) and the touch lines TL connected to the touch electrodes TE in each of the even-numbered rows (ER #2, ER #4, ER #6, ER #8, ER #10, ER #12, ER #14, ER #16, ER #18, and ER #20) may each not overlap with the touch electrodes TE and may each be flush with the touch electrodes.

Figure 6:
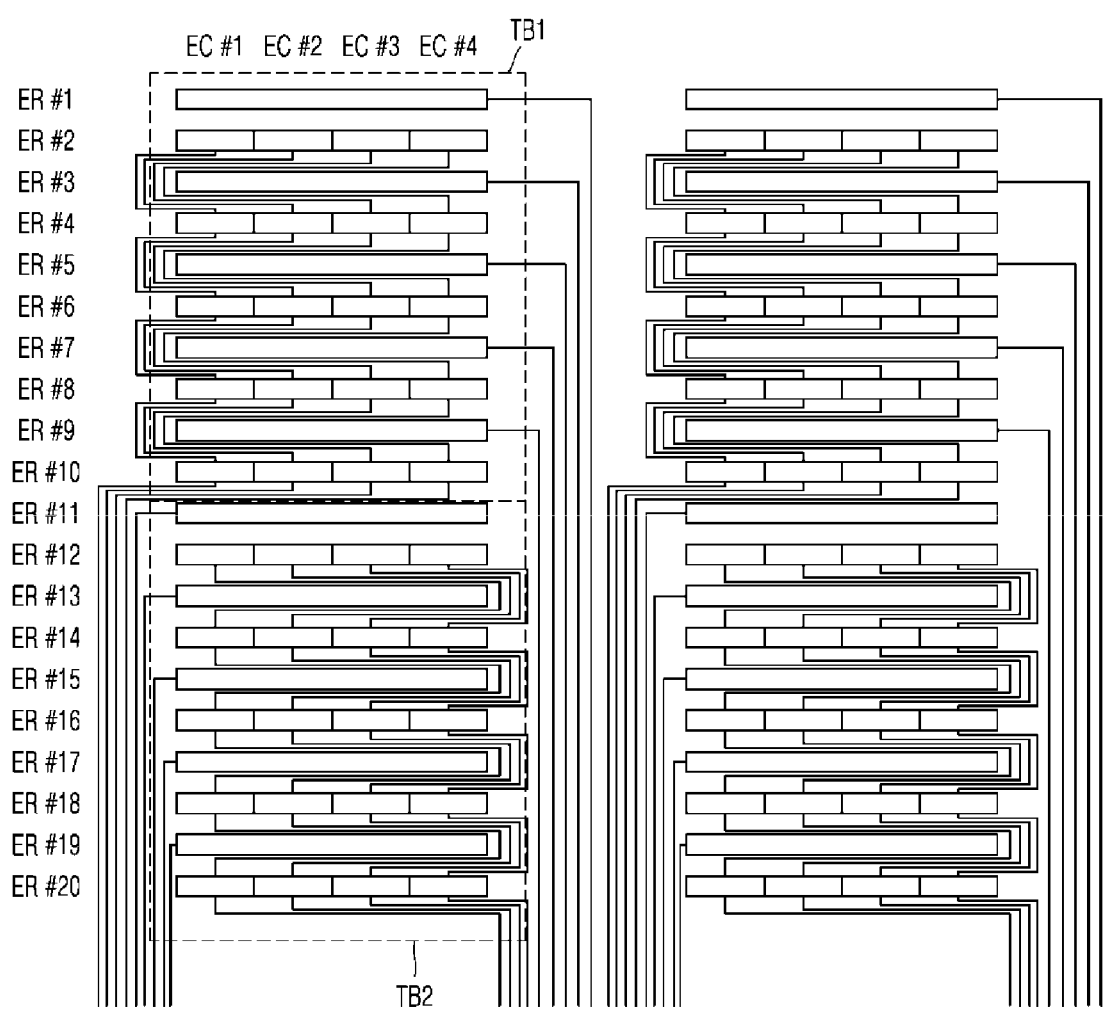
FIG. 6 is a plan view showing example connection between at least one touch electrode and at least one touch line in a touch display panel.

FIG. 6 is a plan view showing example connection between a touch electrode and a touch line in a touch display panel.

The touch electrodes and the touch lines in FIG. 6 may be connected in a different manner from that in FIG. 5.

In some examples, each of four touch electrodes TE disposed in one of even-numbered rows (ER #2, ER #4, ER #6, ER #8, and ER #10) in a touch block TB1 is connected to one of five touch electrodes TE disposed in the same column among the rows (EC #1 to EC #4) through the touch line TL to surround a touch electrode TE disposed in each of odd-numbered rows (ER #3, ER #5, ER #7, and ER #9).

In some examples, in the touch electrode TE disposed in each of the even-numbered rows (ER #2, ER #4, ER #6, ER #8, and ER #10) in the touch block TB1, a touch line TL connects a touch electrode TE in the second row (ER #2) to a touch electrode TE in the fourth row (ER #4) to surround the touch electrode TE in the third row (ER #3) at a first side thereof, a touch line TL connects a touch electrode TE in the fourth row (ER #4) to a touch electrode TE in the sixth row (ER #6) to surround the touch electrode TE in the fifth row (ER #5) at a first side thereof, a touch line TL connects a touch electrode TE in the sixth row (ER #6) to a touch electrode TE in the eighth row (ER #8) to surround the touch electrode TE in the seventh row (ER #7) at a first side thereof, a touch line TL connects a touch electrode TE in the eighth row (ER #8) to a touch electrode TE in the tenth row (ER #10) to surround the touch electrode TE in the ninth row (ER #9) at a first side thereof, in order for the touch lines to be finally connected to the touch driving circuit.

In addition, touch lines TL are connected to touch electrodes TE disposed in the odd-numbered rows (ER #1, ER #3, ER #5, ER #7, and ER #9) in the touch block TB1 at second sides opposite to first sides at which the touch lines TL are connected to the touch electrodes TE disposed in each of the even-numbered rows (ER #2, ER #4, ER #6, ER #8, and ER #10).

Each of the touch electrodes TE disposed in each of even-numbered rows (ER #12, ER #14, ER #16, ER #18, and ER #20) in a touch block TB2 disposed below the touch block TB1 are connected to each of touch lines TL at a second side which are different from the first side at which each of the touch lines TL is connected to each of the touch electrodes TE disposed in each of the even-numbered rows (ER #2, ER #4, ER #6, ER #8, and ER #10).

In addition, touch electrodes TE disposed in the odd-numbered rows (ER #11, ER #13, ER #15, ER #17, and ER #19) in the touch block TB2 are connected to touch lines TL at first sides which are different from second sides at which the touch electrodes TE disposed in the odd-numbered rows (ER #1, ER #3, ER #5, ER #7, and ER #9) are connected to the touch lines TL in the above touch block TB1.

As shown in FIG. 6, the touch lines TL are connected the touch electrodes TE disposed in the odd-numbered rows (ER #1, ER #3, ER #5, ER #7, and ER #9) in the touch block TB1 at the second sides thereof and the touch lines TL are connected to the touch electrodes TE disposed in the odd-numbered rows (ER #11, ER #13, ER #15, ER #17, and ER #19) in the touch block TB2 at first sides thereof.

In addition, the touch line TL is connected to each of the touch electrodes TE disposed in each of the even-numbered rows (ER #2, ER #4, ER #6, ER #8, and ER #10) in the touch block TB1 at first sides thereof and the touch line TL is connected to each of the touch electrodes TE disposed in each of the even-numbered rows (ER #12, ER #14, ER #16, ER #18, and ER #20) in the touch block TB2 at the second sides thereof.

Therefore, the touch lines TL connected to the touch electrodes TE disposed in the odd-numbered rows (ER #1, ER #3, ER #5, ER #7, ER #9, ER #11, ER #13, ER #15, ER #17, and ER #19) and the touch lines TL connected to the touch electrodes TE disposed in each of the even-numbered rows (ER #2, ER #4, ER #6, ER #8, ER #10, ER #12, ER #14, ER #16, ER #18, and ER #20) do not each overlap with the corresponding touch electrodes TE and may be flush with the touch electrodes TE.

In the touch display panel according to the present disclosure, the touch line TL connected to the touch electrode TE does not overlap with the touch electrode TL, and thus, contact holes may be provided at four sides of the touch electrode TL such as a first side or a second side of the touch electrode TL.

Also, two contact holes may be provided in each of four touch electrodes TE disposed in each of the even-numbered rows (ER #2, ER #4, ER #6, ER #8, ER #10, ER #12, ER #14, ER #16, ER #18, and ER #20) and one contact hole may be provided in one touch electrode TE disposed in each of the odd-numbered rows (ER #1, ER #3, ER #5, ER #7, ER #9, ER #11, ER #13, ER #15, ER #17, and ER #19).

The touch electrodes may be flush with the touch lines by arranging the touch electrodes and the touch lines as described above to implement the thinning of the large-sized touch display device. In addition, touch may be implemented by the large-sized touch display device in which touch performance is not degraded even when the number of touch channels is reduced.

Figure 7A:
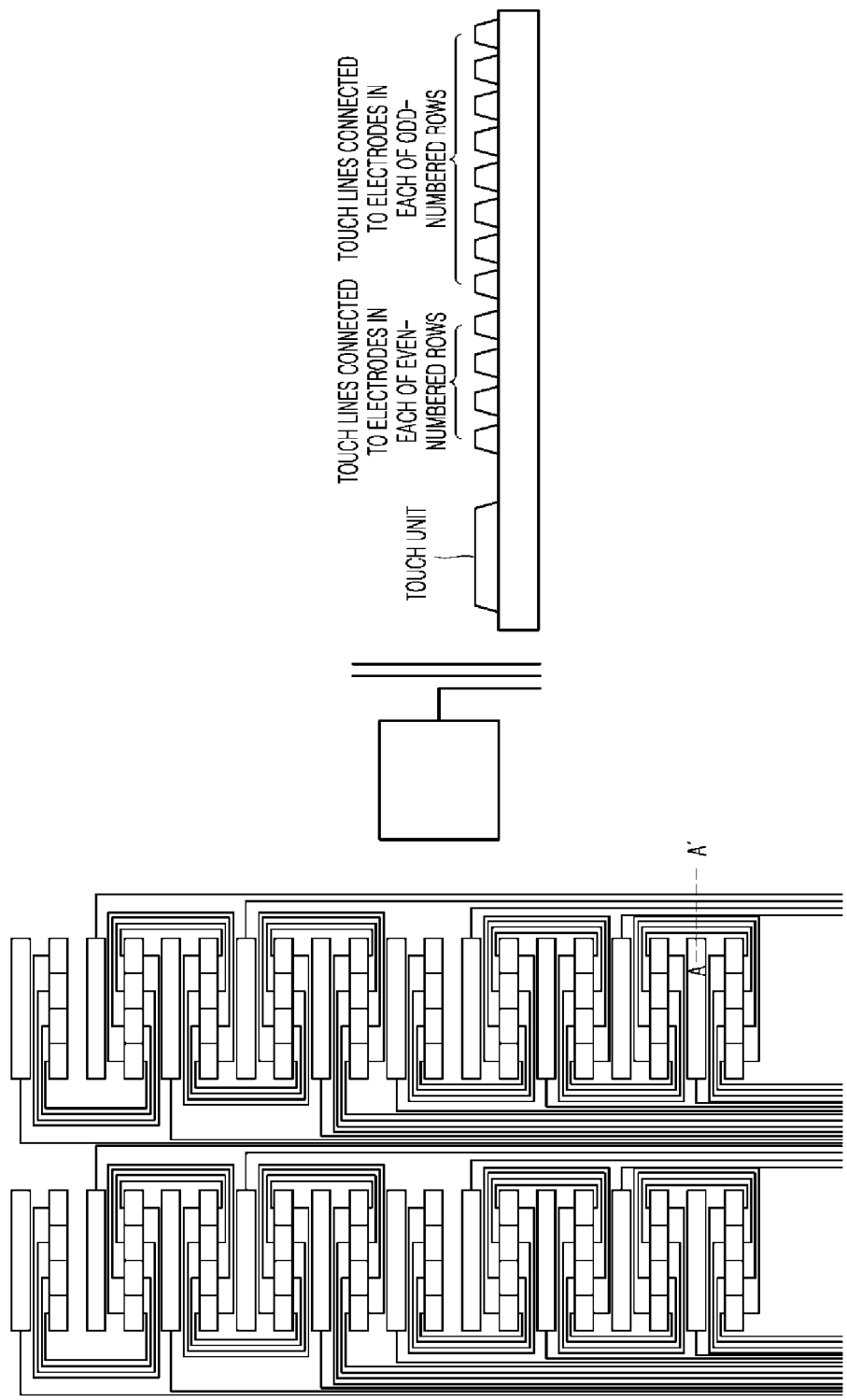
FIGS. 7A and 7B are cross-sectional views showing an example of a touch unit and a touch line in a touch display panel.
Figure 7B:
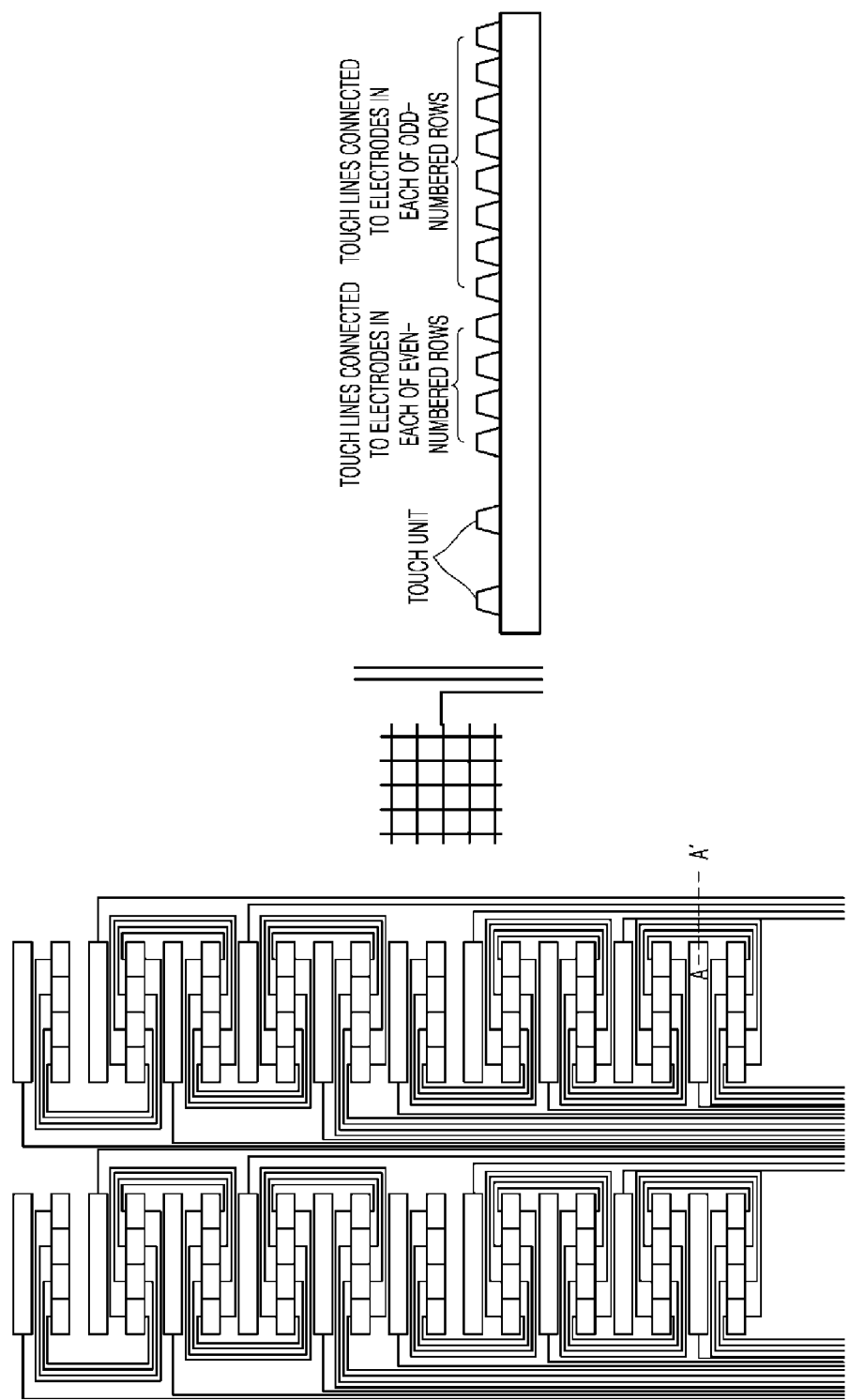

FIGS. 7A and 7B are cross-sectional views showing example touch units and touch lines in a touch display panel.

In the touch display panel according to the present disclosure, each touch electrode may be a plate type touch electrode without an opening or a mesh type touch electrode with one or more openings.

If one touch electrode is the mesh type touch electrode and has a size corresponding to area size of two or more subpixels, one touch electrode has two or more openings and a position and a size of each of the two or more openings may correspond to a position and a size of a light-emitting area of the sub-pixel.

FIGS. 7A and 7B are cross-sectional views taken along line A-A' of a touch display panel shown on the left side of FIGS. 7A and 7B. Each of the schematic diagram on the left side of FIGS. 7A and 7B are identical to each other. For example, FIG. 7A shows that a touch electrode is a plate type touch electrode without an opening. FIG. 7B shows that a touch electrode is a mesh type touch electrode with an opening.

As shown in FIGS. 7A and 7B, four electrode lines are arranged in even-numbered rows and eight electrode lines are arranged in odd-numbered rows in a cross-section taken along line A-A'.

As shown in FIGS. 7A and 7B, in the touch display panel according to the present disclosure, a touch electrode and a touch line may be arranged side by side to implement the thinning of the large-sized touch display device. In addition, touch may be implemented by the large-sized touch display device in which touch performance is not degraded even when the number of touch channels is reduced.

Figure 8:
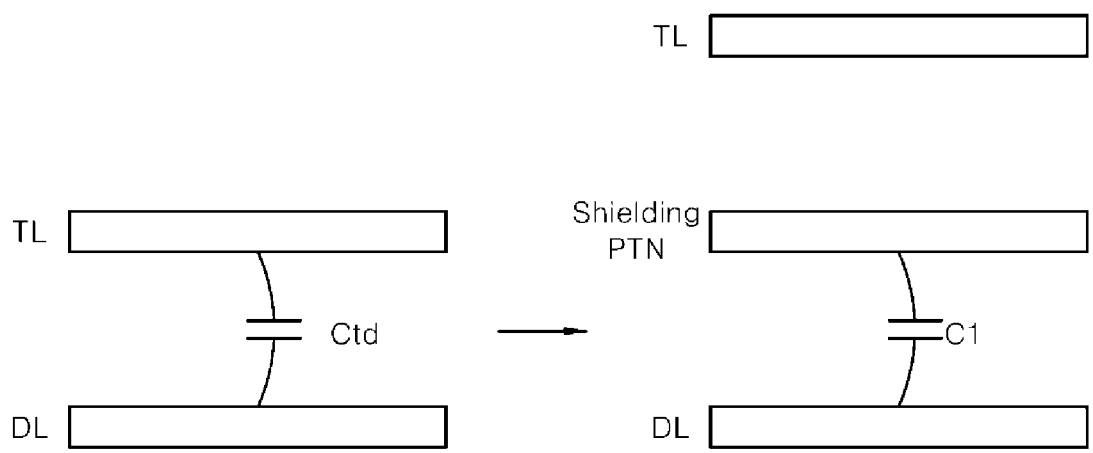
FIG. 8 is a schematic diagram showing an example concept of a shielding pattern included in a touch display panel.

FIG. 8 is a conceptual view showing an example shielding pattern of a touch display device.

Specifically, in the touch display device according to the present disclosure, direct capacitance is not formed between signal lines overlapped with the touch lines TL and the capacitance formed by the signal lines does not affect a touch sensing signal.

Referring to FIG. 8, in the touch display device according to the present disclosure, a plurality of touch lines TL are disposed on a touch display panel and data lines DL may be overlapped with the touch lines TL.

The capacitance Ctd formed directly between the touch line TL and the data line DL may act as noise to the touch sensing signal.

According to the present disclosure, the touch display device disposes a shielding pattern (Shielding PTN) between the touch line TL and the data line DL to prevent the formation of the direct capacitance between the touch line TL and the data line DL.

The shielding pattern (Shielding PTN) may be arranged such that the touch line TL is overlapped with the data line DL and may be overlapped with a portion of the data line DL.

For example, the shielding pattern (Shielding PTN) may be completely overlapped with the data line DL and may be disposed by suitably changing an overlapped area as necessary.

A shielding signal is applied for at least some of periods, among a period for which the touch driving signal is applied to the touch line and capacitance C1 is formed between the shielding pattern (Shielding PTN) and the data line DL. The capacitance C1 formed by the data line DL may not directly affect the touch line TL to prevent the capacitance C1 from acting as noise to the touch sensing signal.

FIGS. 9A to 9D respectively show an example shielding pattern provided in a touch display device.

Figure 9A:
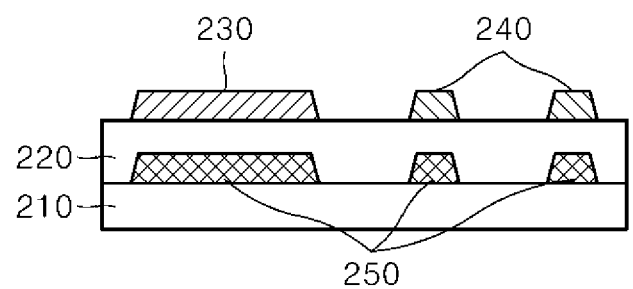
FIGS. 9A to 9D are schematic views showing an example shielding pattern provided in a touch display device.
Figure 9B:
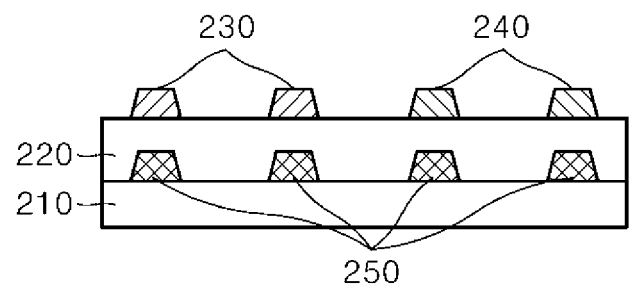

FIG. 9A shows that shielding patterns 250 are disposed below each of a touch unit 230 and touch lines 240 in a touch unit in which a touch electrode is a plate type touch electrode without opening. FIG. 9B shows that shielding patterns 250 are disposed below each of touch units 230 and touch lines 240 in a touch unit in which a touch electrode is a mesh type touch electrode with an opening.

Figure 9C:
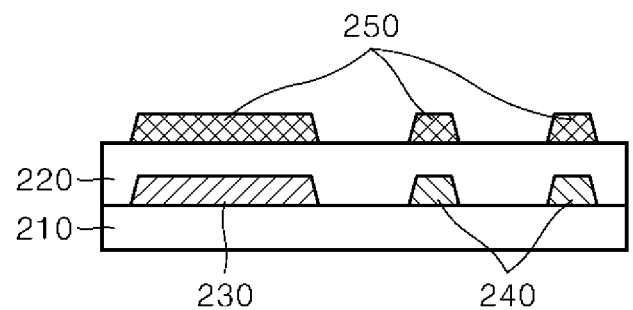
Figure 9D:
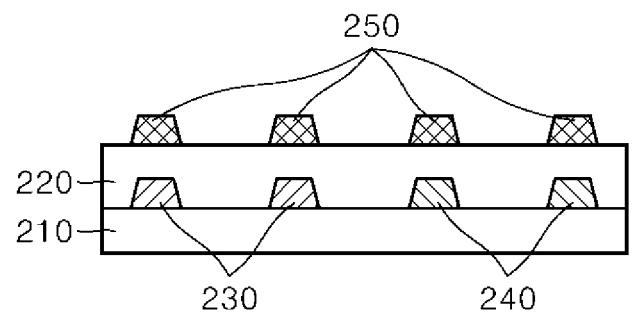

In addition, FIG. 9C shows that shielding patterns 250 are disposed above each of touch units 230 and touch lines 240 in a touch unit in which a touch electrode is a plate type touch electrode without opening. FIG. 9D shows that shielding patterns 250 are disposed above each of touch units 230 and touch lines 240 in a touch unit in which a touch electrode is a mesh type touch electrode with an opening.

When the shielding patterns 250 are disposed below the touch unit 230 and the touch lines 240 as shown in FIGS. 9A and 9B, a data line may be disposed below the shielding patterns 250.

In addition, when the shielding patterns 250 are disposed above the touch unit 230 and the touch lines 240 as shown in FIGS. 9C and 9D, a data line may be disposed above the shielding patterns 250.

When a type of a touch sensor structure such as the plurality of touch electrodes and the plurality of touch lines constituting the touch panel is an embedded type, where the embedded type touch sensor is formed together with electrodes and signal lines for driving a display, the shielding patterns 250 may be disposed below the touch unit 230 and the touch lines 240 as shown in FIGS. 9A and 9B.

In some cases where the touch panel is an external type touch panel or an add-on type touch panel disposed at an outside of the display panel, the shielding patterns 250 may be disposed above the touch units 230 and the touch lines 240.

In FIGS. 9A through 9D, in the case of the embedded type touch panel, the shielding patterns 250 are disposed on a protective layer 210 as an insulating film, and in the case of the external type touch panel, the shielding patterns 250 are disposed on a glass 210 and a passivation layer 220 may be disposed between the shielding patterns 250, the touch unit 230, and the touch lines 240.

Figure 10:
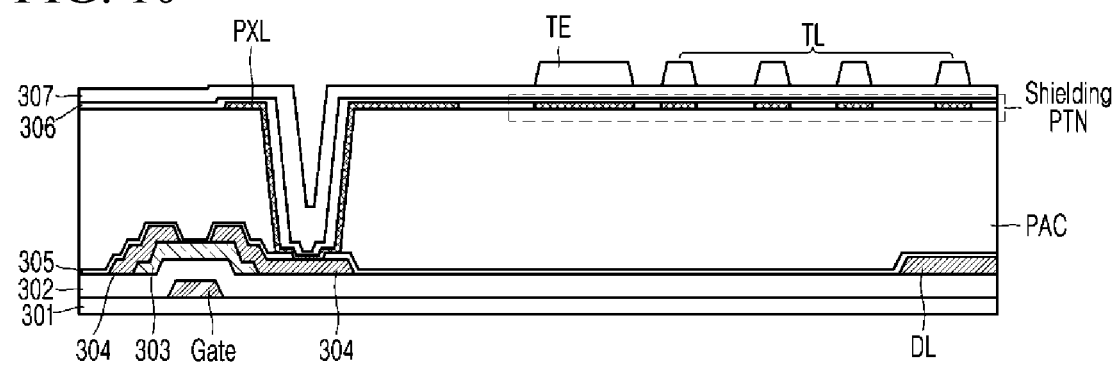
FIG. 10 is a cross-sectional view showing an example touch display device.

FIG. 10 is a cross-sectional view showing an example touch display device.

Referring to FIG. 10, in the touch display device, a gate electrode (Gate) is disposed on a substrate 301 and a gate insulating layer 302 is disposed on the gate electrode (Gate).

An activation layer 303, a source/drain electrode 304, and a data line DL are disposed on the gate insulating layer 302. A first protective layer 305 is disposed on each of the source/drain electrode 304 and the data line DL and a planarization layer PAC is disposed on the first protective layer 305. The first protective layer 305 and the planarization layer (PAC) may each be made of an insulating material.

A pixel electrode PXL is disposed on the planarization layer PAC and the pixel electrode PXL may be connected to the source/drain electrode 304 through a contact hole CH. In addition, a second protective layer 306 and a third protective layer 307 may each be disposed on and above the pixel electrode PXL and the touch electrode TE and the touch lines TL may be disposed above the pixel electrode PXL. Only one of the second protective layer 306 and the third protective layer 307 may be disposed.

A shielding pattern (the shielding PTN) may be disposed in a region where the touch line TL and the data line DL overlap with each other in a layer on which the pixel electrode PXL is disposed and may be insulated from the pixel electrode PXL.

For example, in the touch display device according to an embodiment of the present disclosure, the shielding pattern (the shielding PTN) may be disposed on the same layer as the pixel electrode PXL and may be made of the same material as the pixel electrode PXL. In this case, the shielding pattern (the shielding PTN) may be electrically insulated from the pixel electrode PXL.

In addition, although not shown in the drawings, in another embodiment, the touch electrode TE and the touch lines TL may each be disposed between the planarization layer PAC and the shielding pattern (the shielding PTN). In this case, one passivation layer may be further disposed between the touch electrode TE/the touch lines TL and the shielding pattern PTN or a stacking sequence among the second protective layer 306, the pixel electrode PXL, and the shielding pattern (the shielding PTN) may be changed.

The shielding pattern (the shielding PTN) may completely include an area where the touch line TL and the data line DL overlap with each other or may include at least some portion of an area where the touch line TL and the data line DL overlap with each other.

Therefore, the shielding pattern (the shielding PTN) is disposed between the touch line TL and the data lines DL to prevent the formation of the direct capacitance between the touch lines TL and the data line DL.

Although the present disclosure has been described as described above with reference to the exemplary drawings, the present disclosure is not limited to the embodiments and the drawings disclosed herein, and various modifications can be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

DESCRIPTION OF REFERENCE NUMERALS

100: Touch display device
110: Touch display panel
120: Data driver
130: Gate driver
140: Timing controller
150: Touch driving circuit
160: Power driving circuit

What is claimed is:
1. A touch display panel, comprising:
a plurality of touch blocks with a plurality of touch electrodes arranged in a row direction; and
a plurality of touch lines arranged in a column direction and connected to the touch electrodes, wherein the touch block comprises touch electrodes disposed in each of a first row to an n-th row, where n is a natural number that is equal to or greater than 2,
wherein one touch electrode is disposed in each of odd-numbered rows among the touch electrodes in the first row to the n-th row,
wherein two or more touch electrodes are disposed in each of even-numbered rows among the touch electrodes in the first row to the n-th row,
wherein touch electrodes disposed in the odd-numbered rows are connected to different touch lines,
wherein each of the two or more touch electrodes disposed in each of the even-numbered rows is connected to at least one of the touch lines,
wherein the plurality of touch lines disposed in each of the plurality of touch blocks do not overlap with one another,
wherein at least one touch electrode among the two or more touch electrodes is disposed in the even-numbered rows, the at least one touch electrode including a first side and a second side opposite the first side,
wherein the first side of the at least one touch electrode is connected to a different touch line from the second side of the at least one touch electrode, and
wherein the respective touch lines of the plurality of touch lines are connected only to a first side of each of the two or more touch electrodes in a $2^{nd}$ row of touch electrodes.

2. The touch display panel of claim 1, wherein each of the two or more touch electrodes disposed in each of the even-numbered rows has a substantially same size as one touch electrode disposed in each of odd-numbered rows.

3. The touch display panel of claim 1, wherein four touch electrodes are disposed in each of the even-numbered rows in the touch block.

4. The touch display panel of claim 1, wherein each of the two or more touch electrodes disposed in each of the even-numbered rows in the touch block is connected to the same touch line as five touch electrodes disposed in the same column.

5. The touch display panel of claim 1,
wherein the touch electrodes disposed in the odd-numbered rows in the touch block are alternately connected to the touch lines at a first side and a second side of the touch electrode, and
wherein each of the touch electrodes disposed in each of the even-numbered rows in the touch block is connected to the touch line to surround each of the touch electrodes disposed in each of the even-numbered rows at either the first side or the second side thereof.

6. The touch display panel of claim 1,
wherein each of the touch electrodes disposed in each of the even-numbered rows in the touch block is connected to the touch line to surround each of the touch electrodes disposed in the odd-numbered rows at a first side thereof, and
wherein each of the touch electrodes disposed in the odd-numbered rows in the touch block is connected to the touch line at a second side opposite to the first side at which each of the touch electrodes disposed in each of the even-numbered rows is connected to the touch line.

7. The touch display panel of claim 5 or 6, wherein the touch electrodes are substantially flush with the touch lines.

8. A touch display device, comprising:
a plurality of touch blocks with a plurality of touch electrodes disposed in a row direction;
a plurality of touch lines disposed in a column direction and connected to the touch electrodes;
a data line disposed either above or below each of the touch electrode and the touch line,
wherein the touch block comprises touch electrodes disposed in a first row to an n-th row, where n is a natural number that is equal to or greater than two,
wherein one touch electrode is disposed in each of odd-numbered rows among the touch electrodes in the first row to the n-th row,
wherein two or more touch electrodes are disposed in each of even-numbered rows among the touch electrodes in the first row to the n-th row,
wherein touch electrodes disposed in odd-numbered rows are connected to different touch lines,
wherein each of the two or more touch electrodes disposed in each of the even-numbered rows is connected to at least one of the touch lines,
wherein a plurality of touch lines disposed in each of the plurality of touch block do not overlap with one another,
wherein at least one touch electrode among the two or more touch electrodes is disposed in the even-numbered rows, the at least one touch electrode including a first side and a second side opposite the first side,
wherein the first side of the at least one touch electrode is connected to a different touch line from the second side of the at least one touch electrode, and
wherein the respective touch lines of the plurality of touch lines are connected only to a first side of each of the two or more touch electrodes in a $2^{nd}$ row of touch electrodes.

9. The touch display device of claim 8, comprising a shielding pattern disposed between the touch electrode, the touch lines, and the data line in the touch block and overlapped with each of the touch electrode and the touch lines.

10. The touch display device of claim 8, wherein each of the two or more touch electrodes disposed in each of the even-numbered rows has a substantially same size as one touch electrode disposed in each of the odd-numbered rows.

11. The touch display device of claim 8, wherein four touch electrodes are disposed in each of the even-numbered rows in the touch block.

12. The touch display device of claim 8, wherein each of the two or more touch electrodes disposed in each of the even-numbered rows in the touch block is connected to a same touch line as five touch electrodes disposed in a same column.

13. The touch display device of claim 8,
wherein the touch electrodes disposed in the odd-numbered rows in the touch block are connected to the touch lines alternatively at a first side and a second side of the touch electrode, and
wherein the touch electrodes disposed in each of the even-numbered rows in the touch block are connected to the touch lines to surround the touch electrodes disposed in each of the even-numbered rows at either the first side or the second side thereof.

14. The touch display device of claim 8,
wherein each of the touch electrodes disposed in each of the even-numbered rows in the touch block is connected to the touch line to surround the touch electrodes disposed in each of the odd-numbered rows at a first side thereof, and
wherein the touch electrode disposed in each of the odd-numbered rows in the touch block is connected to the touch line at a second side opposite to the first side at which each of the touch electrodes disposed in each of the even-numbered rows is connected to the touch line.

15. The touch display device of claim 13 or 14, wherein the touch electrodes are substantially flush with the touch lines.

16. A touch display device, comprising:
a plurality of touch blocks;
a plurality of touch electrodes included in each touch block of the plurality of touch blocks, the plurality of touch electrodes including:
a first electrode extending from one end of a touch block to an opposite end of the touch block in a first direction, the first electrode disposed in every $(2n-1)^{th}$ row of the touch block;
a plurality of second electrodes disposed adjacent to the first electrode and disposed from one end of the touch block to an opposite end of the touch block in the first direction, the plurality of second electrodes disposed in every $(2n)^{th}$ row of the touch block, n being a natural number; and
a plurality of segmented touch lines including:
a first touch line extending from one of a second electrode of the plurality of second electrodes in a $2^{nd}$ row and only connecting to one of a second electrode of the plurality of second electrodes in a $4^{th}$ row in a same column,
wherein the respective touch lines of the plurality of segmented touch lines are connected only to a first side of each of the plurality of second electrodes in a $2^{nd}$ row of touch electrodes.

17. The touch display device of claim 16, wherein the plurality of segmented touch lines further includes:
a second touch line extending from the one of the second electrode of the plurality of second electrodes in a $4^{th}$ row and only connecting to one of a second electrode of the plurality of second electrodes in a $6^{th}$ row in a same column.

\* \* \* \* \*